Dec. 20, 1955 G. E. HANSEN 2,727,784
SHOWERHEAD OR THE LIKE
Filed Dec. 2, 1952
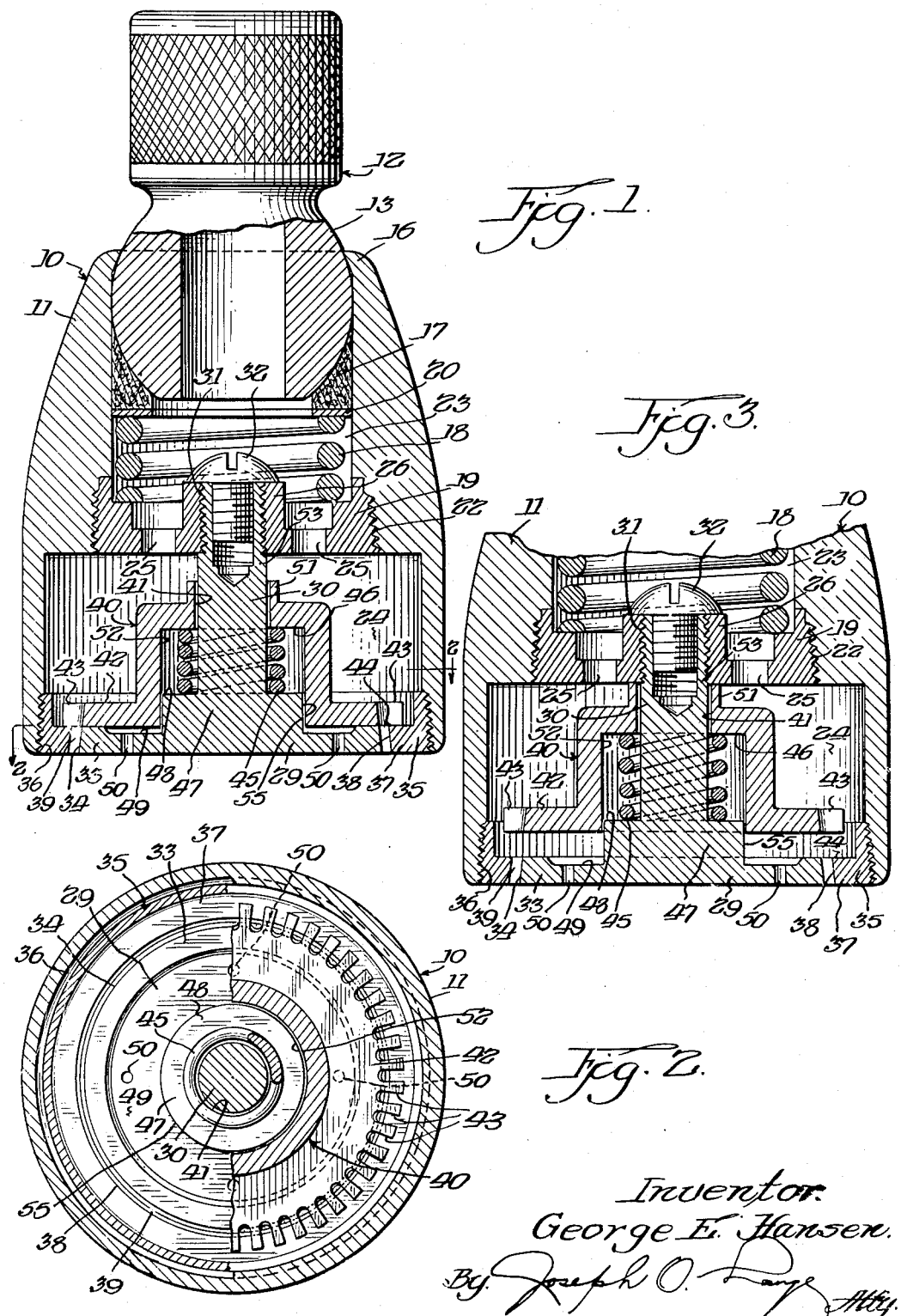
Inventor.
George E. Hansen.
By Joseph O. Lange Atty.

United States Patent Office 2,727,784
Patented Dec. 20, 1955

2,727,784

SHOWERHEAD OR THE LIKE

George E. Hansen, Elmwood Park, Ill., assignor to Crane Co., Chicago, Ill., a corporation of Illinois Application December 2, 1952, Serial No. 323,563

5 Claims. (Cl. 299—59)

This invention relates to a showerhead, spray means, or the like.

It has for its object the provision of a simple and inexpensive construction whereby the jet or discharge orifices and the outlet gap thereof are easily and automatically kept free from the collection of foreign matter normally having a tendency to clog and otherwise interfere with proper and desirable spray characteristics.

It has further for its object the elimination of objectionable dripping.

Other objects and advantages will become apparent in considering an illustrative embodiment of this invention which is shown in the accompanying drawings, in which Fig. 1 is a fragmentary sectional assembly view of the novel showerhead in the operative or spraying condition;

Fig. 2 is a sectional view taken on the line 2—2 of Fig. 1; and

Fig. 3 is a fragmentary sectional view similar to Fig. 1 but showing the showerhead in the fully open and retracted position.

Similar reference numerals refer to similar parts throughout the several views.

The following is a description of the embodiment illustrated:

Referring to Fig. 1 of the drawings, the showerhead, generally designated 10, comprises a casing or body 11 apertured therethrough for the passage of fluid and secured, as by threading (not shown) to a fluid supply pipe (also not shown) by means of a conventional apertured ball connector 12. The head portion 13 of the latter is received within the hollow upper portion of the body and is retained therein for the swivel action by the usual inwardly formed portion 16 at the top of the body. Packing is provided at 17 and is maintained in tight, fluid sealed contact with the head 13 by means of coiled compression spring 18 which abuts a transversely disposed annular partition or spider 19 at the bottom thereof, bearing against an interposed washer element 20 at the top of the chamber.

The partition may be formed integral with the body 11 but is shown as a separate member of annular form threadedly received within the body at 22, said member dividing the showerhead into upper and lower chambers 23 and 24, respectively. Openings annularly disposed are provided at 25 around a raised center portion 26 for fluid supply to the lower chamber.

The lower limits of the chamber 24 are defined at the bottom by an annular base portion 29 supported from within said chamber by a shank or stem 30 threadedly received at 31 in the hub of the partition. A lock screw 32 secures the shank or stem and the supported base portion to the body 11 through the partition 19 to attach them to the latter. The stem 30 comprises a straight upper portion 53 of uniform cross section in the present instance circular and an enlarged portion 54 presently also circular at the lower end adjacent the base portion 29. The outer part 33 of the base portion is substantially flat or disc-like and is defined on outer periphery by a slightly beveled or inclined divergent smooth annular surface 34 as shown. An annular ring-like member 35 is mounted within the body 11 as by threading at 36, the said member providing the casing or body with an inwardly directed portion or flange 37 at substantially the lower end thereof. The latter flange portion is positioned in transverse alignment with the outer part 33 of the base portion and being preferably of the same thickness. It is defined inwardly by a smooth annular surface 38 having the same inclination or divergence as the annular surface 34 of the base portion and forming an annular outlet gap 39 therewith of uniform width.

Mounted on the upper straight portion 53 of the stem 30 for reciprocating movement within the chamber 24 is an inverted cup-shaped member 40 apertured at 41 for said mounting and having an inner peripheral surface 52 for additional support and guidance thereof by engagement with the outer surface 55 of the enlarged end portion 47. The cup-shaped member is also provided with a flat annular face portion 42 for overlapping abutting contact with the coplanar interior flat surfaces 55 and 56 of the flange and the outer part of the base members 37 and 33, respectively. The face portion is made with spaced, annularly arranged radially transversely extending grooves 43 around the outer periphery or edge thereof (see Fig. 2) for the formation of an inner series of discharge orifices in cooperation with the upper annular edge 44 of the body flange 37 at such time as the cup-shaped face member 40 is in the lower abutting or spray forming position shown in Fig. 1. The latter position it should be understood is assumed as soon as the water supply is turned on by reason of the action of fluid pressure being applied on the upper surfaces of the reciprocally mounted face member 40. A relatively light coil spring 45 is provided to raise or withdraw the member 40 from seating or abutting contact with the top of the flange and base portions when the fluid supply is shut off to then assume the position shown in Fig. 3. The spring 45 is housed within the cupped or cylindrical portion of the member and abuts against the upper inside surface 46 of the same and the transversely extending upper surface 48 of the enlarged end portion 47 of the stem to effect such retractive action.

It should be noted that the grooves or notches 43 have rounded or semi-circular ends or inner surfaces which line up at the rear or inside with the top of the annular surface 34 of the base portion and extend forwardly or outwardly over the outlet gap 39 to form with the side walls of the notches and the annular edge 44 of the flange portion the individual openings or orifices for the production of jet streams when fluid is flowing under line pressure therethrough. The individual streams are directed into the outwardly inclined annular gap 39, being guided by the concentric inner and outer side walls 34 and 38 thereof in the formation of the annular discharge stream or spray. Best results are had by forming the recesses or notches 43 so that the inner or rearwardmost elements thereof are inclined and in a straight line relationship with the inclined inner side wall of the gap or annular surface 34, although vertical notches and other inner wall inclinations produce satisfactory spray characteristics, particularly if the innermost elements run even at the bottom with the top of the annular surface 34 forming a smooth transition.

The apertured cup or face member 40 fits sufficiently close around stem portion 53 at the top and the outer periphery 55 of the enlarged portion 47 of the stem at the bottom to afford proper seating and abutting relationship during fluid discharge and guidance and support during reciprocal movement thereof. This fit is made sufficient as not to interfere with the free movement of the member 40 along the stem. Moreover, it is desirable that line fluid have sufficient access around the stem to fill the hollow inside of the cup-shaped member and the annular recess 49 in the base portion 29 thereby to provide for additional jet streams discharging under pressure through the apertures 50 in the base portion.

As previously explained, the reciprocally mounted face member 40 is retracted or lifted by the action of coil spring 45 from its seated or abutting relation with the top of the flange 37 and the upper surface of the disc-like margin 33 of the base portion immediately upon the shutting off of line flow. To prevent blockage or obstruction of the aperture 25 in the partition 19 and thus insure free and rapid drainage of fluid thereabove with the elimination of objectionable and frequently prolonged dripping, an annular collar or lip extension 51 is provided at the upper end of the member 40 to stop or limit its upward travel during such retraction. Thus, the fluid stream discharges out of the showerhead through the annular gap 39 which has now been opened and fully exposed by the withdrawal of the face member 40 therefrom. Discharge of the fluid is further accelerated by the annularly arranged apertures 50 which are also exposed by the lifting of the member 40, thus providing additional avenues for drainage from the head when the shower valve has been closed.

It will be noted that the collar portion 51 by virtue of its cooperation with the stem portion 53 also provides for additional support and guidance of the reciprocating member 40 when the latter is returning to its seated or stream forming abutting position (Fig. 1).

The retractable face member and the relatively wide annular gap taken with the stop 51, all of which provide for free passage of fluid when the shower is shut off, render the showerhead of the present invention self cleaning by way of substantial flushing of the internal parts and annular gap immediately before and again immediately after the face member has assumed its operative or spray forming position, the first flushing being under pressure and blowing out any sediment or dislodged foreign matter in an initial gush. Further, the face member is brought down forcefully by fluid pressure into operative abutting relation with the top of the flange and marginal seat portion of the base to break up, loosen or otherwise dislodge any deposit or foreign matter forming or accumulating on these members or on the surfaces of the face member before hardening or accumulation thereof has progressed to any substantial degree. Also, matter may be dislodged by the impact of the reciprocating cup-shaped face member against the underside of the spider 19 during the upward movement thereof, particularly in combination with the cleansing or flushing action of fluid discharging or draining therearound.

The showerhead is thus repeatedly and automatically opened and flushed out during the course of ordinary operation to prevent the small jet orifices or openings from becoming clogged and ineffective and therefore to eliminate the need of periodic inspection, disassembly and hand cleaning.

Objectionable dripping is eliminated by the provision of large and adequate passageways for the rapid release and discharge of water remaining within and above the showerhead after the shower valve has been shut off.

It should be evident from the foregoing description that a showerhead or similar spray device of the automatic self-cleaning type has been provided which is of unusual, beneficial construction and arrangement of parts, with improved operation resulting therefrom.

It should also be understood that the drawing and the above description is illustrative and that the present invention should be limited in the spirit thereof as set forth in the appended claims.

I claim:

1. A showerhead or the like comprising a body apertured for the passage of fluid therethrough, said body having a shelf-like portion extending inwardly therearound adjacent one end and a base portion inside said shelf-like portion and uniformly spaced therefrom, the inner and outer peripheries of said shelf-like and base portions respectively forming continuous spaced side walls of an annular outlet gap, fixed shank means supporting said base portion from within said body, a movable member reciprocally mounted on said shank means, said member having recesses spaced around the outer marginal portion thereof, said portion being adapted at one extreme position of said movable member to provide abutting engagement with the interior transverse surfaces of said shelf-like and base portions adjacent the outlet gap whereby to span said gap to form an enclosed series of discharge orifices with the inner edge of said shelf-like portion for the emission of fluid through said outlet gap in spray form.

2. A showerhead or the like comprising a body apertured for the passage of fluid therethrough, said body having a shoulder portion around the inside thereof adjacent one end and a base portion inside said shoulder portion and uniformly spaced therefrom, the inner and outer peripheries of said shoulder and base portions respectively forming spaced side walls of an outlet gap, each of said portions having therebetween flat co-planar interior surfaces contiguous to said outlet gap, axially immovable stem means locked against rotation within the body, said base portion being supported from within said body by said stem means, a cup-shaped member mounted on said stem means for reciprocal movement within said body, said member having a flat outer marginal portion axially grooved around the outer periphery thereof, said latter portion being adapted to abut the co-planar interior surfaces of said shoulder and base portions of the body to limit movement of the cup-shaped member in one direction, said marginal portion thereof spanning said outlet gap during said abutment contact so that grooves therein form in cooperation with the gap forming edge of said shoulder portion an enclosed series of discharge orifices for the emission of fluid through said gap from within said body.

3. A self-cleaning showerhead or the like comprising a body apertured for the passage of fluid therethrough, said body having a flange portion extending around an inside end portion thereof and a base portion inside said flange portion and uniformly spaced therefrom, the inner and outer peripheries of said flange and base portions respectively forming annularly spaced side walls of an outlet gap for the said body, said latter portions having flat co-planar interior surfaces contiguous to said outlet gap therebetween, axially immovable stem means non-rotatably mounted within the said body, said base portion being supported from within said body by said stem means, said stem means having a section of uniform size and shape and an enlarged portion at an opposite end thereof, a hollow cup-shaped member mounted on the uniform size section of the said stem means for reciprocal movement within said body, the said member being additionally supported for such movement and transversely positioned when at rest by engagement with an outer surface of said enlarged portion of the stem means, the said cup-shaped member having a flat outer marginal serrated portion, said cup-shaped member being actuatable by the impingement of fluid under line pressure thereon to engage in abutting relation the co-planar interior surfaces of the said flange and base portions of the body, the said marginal portions thereof in the abutting position of the cup-shaped member spanning the outlet gap so that recesses between the said serrations form in cooperation with the gap forming edge of said flange portion an enclosed series of orifices for the discharge of jet-like streams into said outlet gap and the subsequent formation of a fluid spray, resilient means mounted within the said cup-shaped member for withdrawal of the cup-shaped member from said abutting spray forming engagement upon cessation of line pressure for facilitating a flushing action and relatively rapid fluid drainage therefrom.

4. A shower bath spray head or the like comprising a body apertured for the passage of fluid therethrough, the aperture portions including a ring-like gap formed to penetrate a transverse end wall of the said body, the said wall having on an inner surface portion thereof marginal surfaces in the same plane defining inner and outer peripheral edges of the said ring-like gap, a resiliently biased inverted cup-shaped member reciprocally movable in said body, the said cup-shaped member having a serrated peripheral portion adapted to overlie and span said ring-like gap upon abutting engagement of the said cup-shaped member with the said marginal surfaces in the same plane, the recesses of the serrated peripheral portion of the cup-shaped member forming in cooperation with the ring-like gap a plurality of annularly arranged spaced-apart orifices for the discharge of fluid through the body passage.

5. A showerhead or the like comprising a body apertured for the passage of fluid therethrough and including guide means therewithin, said body having inner and outer portions adjacent one end thereof in substantially the same plane and transversely spaced from each other annularly thereby to form an outlet or discharge gap of substantially circular configuration, a reciprocally movable member within said body, said member being hollow and slidably engageable with said guide means for transverse positioning in a plurality of planes within said body upon the occurrence of predetermined fluid flow, said hollow member also having a series of recesses in spaced annular arrangement on a lower flanged portion thereof in communication with the fluid flow in said body, the said flanged portion of said hollow member being engageable with an interior transverse surface of each of said gap forming portions of the body in abutting relation at one limit of movement of said reciprocally movable hollow member, the said flanged portion of the hollow member simultaneously spanning said ring-like gap whereby to form a plurality of relatively small discharge orifices with the gap forming edge of at least one of said gap forming portions for the emission of fluid from within said body through said outlet gap.

References Cited in the file of this patent

UNITED STATES PATENTS

| | | |
|---|---|---|
| 1,979,104 | Gordon | Oct. 31, 1934 |
| 2,049,141 | Schneider | July 28, 1936 |
| 2,118,943 | Price | May 31, 1938 |
| 2,211,106 | Elliott | Aug. 11, 1940 |
| 2,222,465 | Nystrom | Nov. 19, 1940 |
| 2,348,776 | Bentley | May 16, 1944 |
| 2,680,043 | Campbell | June 1, 1954 |
| 2,688,515 | Filliung | Sept. 7, 1954 |